Dec. 27, 1966   C. C. BEUSMAN   3,293,731
METHOD OF MAKING A COULOMETRIC DEVICE
Original Filed June 4, 1962
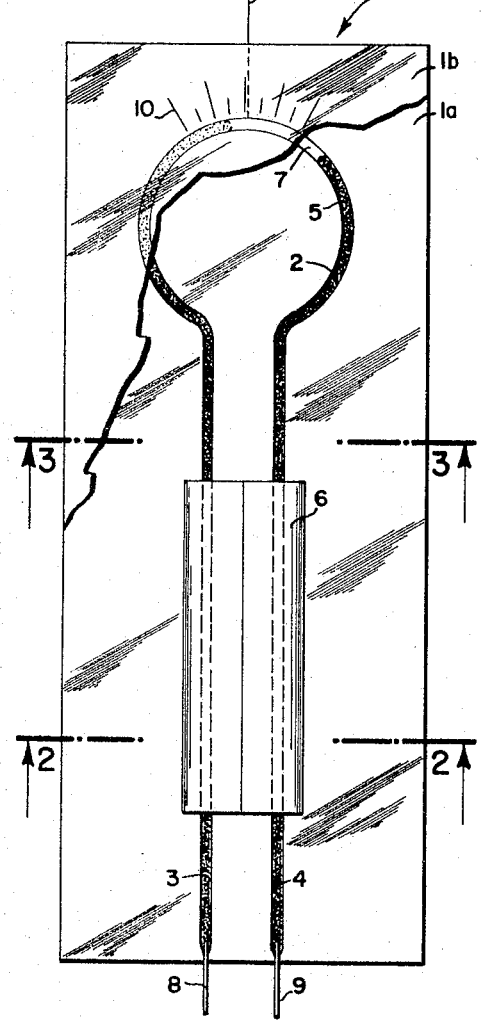
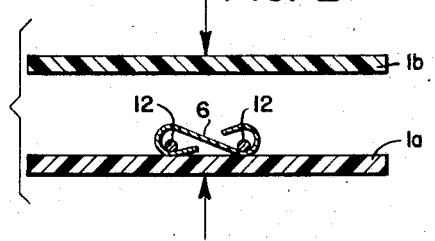
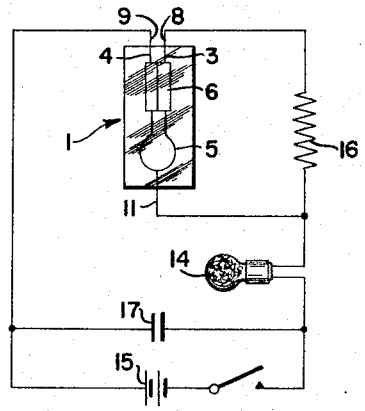
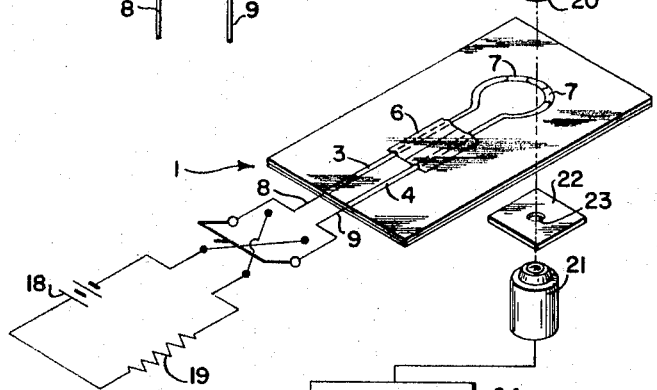
INVENTOR
CURTIS C. BEUSMAN
BY
ATTORNEYS United States Patent Office 3,293,731
Patented Dec. 27, 1966

3,293,731
METHOD OF MAKING A COULOMETRIC DEVICE
Curtis C. Beusman, Chappaqua, N.Y., assignor to Curtis Instruments, Inc., Mount Kisco, N.Y., a corporation of New York
Original application June 4, 1962, Ser. No. 199,795, now Patent No. 3,193,763, dated July 6, 1965. Divided and this application Feb. 10, 1965, Ser. No. 438,456
10 Claims. (Cl. 29—155.5)

This is a division of application Serial No. 199,795, filed June 4, 1962, now Patent No. 3,193,763, issued July 6, 1965.

This invention relates to coulometric devices and more particularly to a novel configuration of the components of such devices and to a novel method of making such devices.

According to my invention, I provide a body of non-conductive material which has a channel formed therein. A slug of non-conductive material which is free to move along said channel is located in the channel at a position intermediate the ends thereof. Columns of liquid metal fill the straight portions of the channel on each side of the slug of non-conductive material. A body comprising electrolyte material is connected to each of the liquid metal columns. Means are provided for connecting an external source of potential across the columns.

A coulometric device according to my invention is especially useful as a current integrator and as an operating time indicator, both of these applications being known for devices of this general kind.

Moreover, by combining with the basic device any of several means for detecting the interface between one of the columns of liquid metal and the slug of non-conductive material, the device may also be made to serve as an electric control device or switch. But the device is especially useful in that it may be made by simple and inexpensive methods, one of which is an integral part of the present invention. My new coulometer may also be made very small and in a wide variety of configurations, sizes and current measuring and time indicating capacities. It has good resistance to shock and will operate continuously and well even though subjected to continuing vibration. These and other features will be more apparent from the description of a preferred embodiment of the invention which will be given below.

The method according to my invention is especially well suited to the manufacture of my new coulometer. It may, however, be used to manufacture coulometers of other types as well. In my new method I position a filamentary body in a predetermined configuration on a surface. I then superpose on said body a layer of non-conductive material which is deformable under pressure and which will retain a permanent set upon release of deforming pressure. Pressure is applied to the superposed layer to cause said filamentary body to be impressed into said deformable material to form therein a channel having the configuration of the filamentary body. The deformable layer is caused to adhere to a base layer of non-conductive material after which I withdraw the filamentary body from the channel. Liquid metal, the electrode material of the coulometer, is then inserted into the channel.

A complete description of a particular coulometer according to my invention is set forth in the following specification together with a full description of the novel method by which the device may be made. In the course of the description reference is made to the accompanying drawing in which:

FIG. 1 is an enlarged plan view, partly broken away, of a coulometric device according to my invention;

FIG. 2 is an exploded sectional view, taken along the line 2—2, of the coulometric device shown in FIG. 1;

FIG. 3 is a sectional view, taken along the line 3—3, of the coulometric device shown in FIG. 1;

FIG. 4 is a schematic circuit diagram illustrating one means of using the coulometric device of FIG. 1 as an electric switch; and FIG. 5 is a schematic circuit diagram showing another means of using the coulometric device of FIG. 1 as an electric circuit controlling means.

Referring now to FIG. 1, a coulometric device according to my invention consists of a body of non-conductive material 1. In the particular embodiment of the device here used to illustrate the invention, the body of non-conductive material is a flat rectangular plate of transparent material such as vinyl resin or glass. A substantially U-shaped channel 2 is formed in the body of the transparent material with the ends of the straight portions or legs 3 and 4 of the channel adjacent one edge of the plate 1. The legs of the channel are connected together at their other ends by the bow of the channel which is shown at 5. A body of porous substance such as filter paper 6 which is impregnated with a suitable electrolyte is cast or otherwise formed in the transparent plate such that the electrolyte bearing material extends between the two legs of the U-shaped channel with portions of the surface of the porous substance lying in the surface of at least a portion of the periphery of each of the legs of the channel. Two columns of liquid metal fill the legs 3 and 4 of the channel and extend partially into the bow 5 of the channel. The adjacent ends of the two columns of liquid metal in the bow are separated by any convenient distance by a slug of non-conductive material 7 which is free to move along the channel. The slug of non-conductive material may be a gas, such as air, or a fluid or even a solid.

Means are provided at the distal ends of the channel for connecting the two columns of liquid metal to an external source of potential. In this particular embodiment this is accomplished merely by passing conductive electrodes, for example, small wires 8 and 9, through the wall of the non-conductive plate and into the ends of the channel so that they are in contact with the liquid metal in the channel.

In this particular embodiment, the liquid metal forming the two columns in the legs 3 and 4 of the channel is mercury. The slug of non-conductive material 7 between the innermost ends of the two columns of mercury is a small bubble of air. The electrolyte which saturates the porous substance bridging the columns is a water solution of mercuric iodide. I have found that the solubility of mercuric iodide in water can be advantageously increased for this purpose by the addition to the solution of potassium iodide. A satisfactory solution is 0.5 Normal in mercuric iodide and 7 Normal in potassium iodide.

In the particular embodiment here being used to illustrate the invention, the diameter of the bore of the U-shaped channel is less than one millimeter. I have found that channels having a bore up to approximately three millimeters in diameter are satisfactory where the liquid metal is mercury. Columns of mercury up to three millimeters in diameter possess good capillary characteristics and result in columns of mercury which are stable in the bore under even extreme conditions of shock and vibration.

A basic coulometric device such as described above is very useful as an operating time indicator when connected in an electric circuit by means of the wires 8 and 9. When a constant direct current potential is impressed between the leads to the columns of liquid metal, metal ions are transferred from the anode column through the electrolyte and are plated out on the cathode column with the resutl that the anode column becomes shorter and the cathode column becomes longer by the same amount. This will cause the slug of non-conductive material in the bow of the channel to be pushed by the cathode column in the direction of the anode column. If the cross-sectional area of the channel is constant, then the change in length of the columns is, of course, a direct indication of the quantity of electric charge which has flowed. Furthermore, if the current is also constant, the rate at which metal ions are transferred from the anode column to the cathode column is constant and the displacement of the slug of non-conductive material then becomes a direct indication of the length of time the potential has been applied. To facilitate the use of the device as an operating time indicator, it is convenient to scribe a scale in the face of the body of the device along the course of the bow of the channel as indicated at 10. It will be apparent to those skilled in the art that the resistance of the path through which charge flows from the anode column to the cathode column is substantially constant regardless of the relative lengths of the two columns. The accuracy of the device is, therefore, virtually independent of the position of the slug of material which is used as an indicator. Of course, the device will be operative so long as the slug of non-conductive material does not progress in either direction along the channel beyond the electrolyte material.

A device according to my invention can also be made to act as an excellent miniature electric timing switch. One means of accomplishing this is to insert a conductive contact through the wall of the body of the device and into the channel as indicated for example at 11. Any suitable external circuit may be connected between the contact 11 and either of the wires 8 or 9 connected to the columns. So long as this conductive contact is in contact with the slug of non-conductive material in the channel, the external circuit so connected will be open, but as soon as the column of liquid metal which also forms a part of the circuit grows far enough along the channel so that contact 11 contacts the column at the interface between the liquid metal and the slug of non-conductive material, the circuit will be closed. An outstanding feature of my new coulometric device is that it is completely reversible simply by reversing the polarity of potential applied between the columns. This is true whether the device is used as a simple operating time indicator or as a switch. Consequently, the device may also be used as a circuit opening switch provided that its operation is started at a time when the anode column is in contact with the contact 11.

As previously stated, a part of the present invention is a novel method for the fabrication of coulometer devices such as that described in the preceding portions of this specification as well as others. By using this method, coulometer devices may be fabricated simply and inexpensively as well as in extremely small sizes. As an illustration of the latter feature, a coulometer device according to the invention may be made approximately the size shown in FIG. 1 of the drawing, but in fact, I have, using my new method, manufactured many fully operative devices of which the essential components occupy a volume which is approximately 1/4" x 1 1/4" x 1/16".

The method will be described with reference to FIGS. 1, 2 and 3. A filamentary body such as a nickel-iron wire 12 is formed in the U-shape of the channel shown in FIG. 1 and is placed on the surface of a base layer 1a. In this particular example of my new method the base layer is a sheet of transparent vinyl resin. A strip of porous filter paper 6 is formed in a figure-8 shape as seen edge-on in the exploded view of FIG. 2. Each of the loops of the strip of filter paper so formed encloses one of the legs of the wire 12. Then another layer 1b of a thermoplastic vinyl resin is superposed on the combination of the base layer, the wire 12 and the filter paper 6. This entire assembly is then subjected to heat and pressure as indicated by the arrows for two purposes. The heat applied to the resin softens it and the pressure applied to the two layers causes the wire 12 and the filter paper 6 to be pressed into the adjacent surfaces of the layers 1a and 1b of thermoplastic material. The heat and pressure also serve to bond the base layer and the superposed layer of resin togehter with the wire and the filter paper encapsulated between the layers.

It should be noted here that the method is not restricted to the use of thermoplastic material for both layers. Either the base layer or the superposed layer may be thermoplastic and the other layer may be solely for the purpose of transmitting the pressure necessary to embed the wire and the filter paper in the thermoplastic material. Furthermore, the non-thermoplastic layer need not become a part of the final device for after embedding the wire and paper in the thermoplastic layer, the non-thermoplastic layer may be removed and a closure layer may be put in its place and bonded or adhered to the thermoplastic layer. The preferred method is, however, to use base and superposed layers, both of which are thermoplastic material.

After the heat and pressure are removed, the wire is withdrawn endwise from between the layers of resin which are now bonded together as shown in FIG. 3, thus leaving within the laminated structure a channel which is U-shaped in the plan view of FIG. 1 of substantially uniform cross section. It should be noted at this point that portions of the legs of the channel also pass through the loops of the filter paper embedded in the laminar structure.

Upon withdrawal of the wire from the channel electrolyte solution is injected into the open channel by means of a hypodermic needle or other suitable means. Because of the porous nature of the filter paper, the electrolyte solution will be absorbed by it until the paper is saturated. The channel is then flushed with mercury so that it is full of the liquid metal and there are no random air bubbles entrapped in the channel. The mercury may also be injected into the channel by means of a hypodermic needle. The slug 7 of non-conductive material is then introduced into the channel through one of the open ends. If the non-conductive material is to be a simple air bubble or a small quantity of liquid, it may be injected by means of a hypodermic needle and then pushed along the channel by additional mercury until it is positioned at any desired location such as in the bow of the channel. There is thus formed in the channel two columns of mercury separated at their innermost ends by a slug of non-conductive material.

Electric contacts with the two columns of mercury in the channel are provided as follows. A mercury-plated, nickel-iron wire is inserted into each of the open ends of the channel so that it is in contact with the mercury column in that leg of the channel and these leads 8 and 9 are then heat-sealed in place by inserting the marginal edge of the laminated structure in a heated press to close the open ends of the channel and securely embed portions of each of the wires in the thermoplastic material. I have found it useful to roughen the wires at the places where they will be embedded in plastic so that they may not easily be pulled out. The purpose of plating the wires before inserting them in the channels is to insure good electric contact with the mercury columns.

The foregoing steps form the basic coulometer according to my invention. As will be apparent to those skilled in the art, many modifications of the method will be made. For example, only one of the layers of the laminated structure need be deformable under heat and pressure in which case the heat and pressure applied to the assembled structure will result in the wire or other filamentary body being embedded only in the deformable layer of the channel, while being bounded by the non-deformable layer about a portion of its periphery, will be essentially entirely within the deformable layer. Any suitable porous medium such as matted or compacted fibrous or cellular material may be used to absorb the electrolyte and it will, according to its nature, be positioned in the laminate so that the electrolyte is in electrical contact within the columns of liquid metal in the two legs of the channel.

When one wishes to form the switch-type coulometric device having the contact 11 located for example in the bow 5 of the channel, the contact may be formed by looping a small wire around the bow of the wire used to form the channel in the plastic material. At the time the U-shaped wire or other filamentary body is positioned on the base layer the steps of the method previously described are then followed through to the end and the loop of contact wire which was formed around the channel forming wire will be securely and permanently positioned within the channel after the channel forming wire is removed. Of course, the end of the contact wire opposite the loop is made long enough to extend beyond the outer edge of the thermoplastic material so that it may be used as a lead to connect the contact into an external circuit.

It should be apparent to those skilled in the art that my new method of forming a coulometer may also be adapted to form coulometers which do not incorporate the porous material extending between the two columns of mercury in the channel. For example, my new method may be used to make known types of coulometric devices in which the electrolyte solution occupies a position in the channel between the innermost ends of the two columns of liquid metal.

I have illustrated in FIGS. 4 and 5 two means of applying the coulometric devices according to my invention. In FIG. 4 I illustrate a simple circuit in which the coulometric device is used as an electric switch. Here the device includes the contact wire 11 described in connection with FIG. 1. The device is used to fire a flashbulb 14 at the end of some predetermined interval. The flashbulb is connected in series with a battery 15, a resistor 16, and the mercury columns in the legs 3 and 4 of the channel. A storage capacitor 17 is connected in shunt to the battery or other source of D.C. potential. The contact wire 11 is connected to the junction between one terminal of the flashbulb 14 and the resistor 16.

In operation, the battery charges the capacitor 17 and it also serves as the source of potential for the coulometric device. The coulometric device may be pre-set so that, at the specific current through the resistor, it will require some predetermined time for the anode column to grow along the channel until it contacts the contact wire 11. In the terms I have previously used in the course of this specification and in the claims, this is one means of detecting the interface between the mercury column and the slug of non-conductive material.

It will be apparent that, so long as the slug of non-conductive material is in the portion of the bow of the channel where the contact wire 11 is located, the current through the flashbulb will be limited by the value of the resistor 16 which also determines the current flow through the coulometric device. This current is selected so that it is not great enough to cause the flashbulb to ignite.

When the anode column reaches the contact wire 11 the resistor 16 is shunted out of the circuit by the much lower resistance of the circuit including the contact wire 11, the anode column, the capacitor 17 and the flashbulb 14. This permits the capacitor to discharge through the flashbulb and the discharge current is sufficient to ignite the flashbulb.

In FIG. 5 I have illustrated a photoelectric means for detecting the interface between the mercury column and the slug of non-conductive material. The coulometric device is connected in a conventional circuit including a battery 18 and a resistance 19. A light source such as the light bulb 20 is positioned on one side side of the device and a photoelectric cell 21 is positioned on the opposite side. A mask 22 having a small aperture as indicated at 23 is positioned between the device and the photoelectric cell. The output of the photoelectric cell may be connected to any suitable utilization device indicated generally at 24. In this application the slug of non-conductive material between the two columns of mercury in the channel of the device must be translucent so that light from the bulb 20 will be transmitted through it. The mercury itself is, of course, opaque and will interrupt the light from the source. Thus, when the translucent non-conductive material in the channel is in the line between the source and the aperture of the mask, light will fall on the photoelectric cell, and when mercury is in the line between the source and the aperture of the mask the light will be cut off from the photoelectric cell.

A particular feature of my new coulometric device is that the portions of the mercury columns and the slug of non-conductive material in the bow of the channel are not in the circuit by which the device is energized. This makes it practically possible to construct a device which can function as a multiple off-on-off-on-off switch, for example, by introducing into the bow of the channel two or more slugs of translucent non-conductive material and separating these by slugs of mercury or other opaque material which are free to move along the channel. Thus, as the anode column of the device grows along the channel the slugs of translucent and opaque materials are alternately pushed into the line between the light bulb 20 and the aperture 23 in the mask 22. As each interface between the adjacent slugs of translucent and opaque materials traverses this line, the response of the photoelectric cell is switched from off-to-on or on-to-off as the case may be.

In the foregoing description I have described in detail a particular embodiment of my invention and a particular method also in accordance with my invention. It should be understood that the invention is not limited to the details of either the device or the method as set forth. The invention is defined in the following claims.

I claim:

1. A method of forming a coulometric device, which method comprises the steps of forming a filamentary body to a predetermined curvilinear configuration, positioning a body of porous material in spanning relation between spaced positions along said filamentary body with said porous body embracing at least a portion of the periphery of said filamentary body at each of said spaced locations, positioning said filamentary and porous bodies between superposed layers of non-conductive material which is deformable under pressure and which will retain a permanent set upon release of deforming pressure, applying pressure to said superposed layers to cause said filamentary and porous bodies to be impressed into said layers and to cause said filamentary body to form a channel in said layers and through said porous body, withdrawing said filamentary body from said channel, and injecting into said channel two columns of liquid metal such that their adjacent ends are spaced apart at a position intermediate the positions where the channel penetrates said porous body.

2. A method according to claim 1 which further comprises the step of impregnating said porous body with an electrolyte material prior to injecting into said channel said liquid metal, such that said porous body is an electrolytic bridge joining said columns of liquid metal.

3. A method according to claim 1 wherein the step of injecting said liquid metal into said channel includes spacing apart the adjacent ends of said columns by an electrically non-conductive material.

4. A method of forming a coulometric device comprising the steps:

(a) positioning a filamentary body in a predetermined configuration on a surface of a first layer of material, (b) superposing on said filamentary body a second layer of material which is deformable under pressure and will retain a permanent set upon release of said deforming pressure, (c) applying pressure to said superposed layers to cause said filamentary body to be impressed into said deformable layer to form a channel therein, (d) bonding said deformed layer to a base material such that said channel has openings only at its ends, (e) withdrawing said filamentary body from the channel formed in said deformable layer, and (f) inserting metal into said channel.

5. A method according to claim 4 wherein said deformed layer is bonded to said first layer.

6. A method according to claim 4 comprising the further step of applying heat to said layers while said pressure is applied.

7. A method according to claim 4 comprising the further step of applying heat during the bonding step.

8. A method according to claim 4 wherein said first and second layers of material are both deformable under said pressure.

9. A method according to claim 4 wherein said layers are in sheet form.

10. A method according to claim 4 wherein the step of inserting metal into said channel comprises injecting liquid metal therein.

References Cited by the Examiner

UNITED STATES PATENTS 2,373,405  4/1945  Lowit _____ 29—156

JOHN F. CAMPBELL, *Primary Examiner.*

JOHN M. ROMANCHIK, Jr., *Assistant Examiner.*